(12) United States Patent
Catoe et al.

(10) Patent No.: US 10,192,208 B1
(45) Date of Patent: Jan. 29, 2019

(54) SYSTEMS AND METHODS FOR AN IMPROVED SELF-CHECKOUT WITH LOSS PREVENTION OPTIONS

(71) Applicant: ECR SOFTWARE CORPORATION, Boone, NC (US)

(72) Inventors: Peter Catoe, Blowing Rock, NC (US); Burt Aycock, Vilas, NC (US)

(73) Assignee: ECR Software Corporation, Boone, NC (US)

( * ) Notice: Subject to any disclaimer, the term of this patent is extended or adjusted under 35 U.S.C. 154(b) by 435 days.

(21) Appl. No.: 14/326,012

(22) Filed: Jul. 8, 2014

Related U.S. Application Data

(60) Provisional application No. 61/843,616, filed on Jul. 8, 2013.

(51) Int. Cl.
*G06Q 20/20* (2012.01)
*G07G 1/00* (2006.01)
*G07G 1/12* (2006.01)

(52) U.S. Cl.
CPC .......... *G06Q 20/204* (2013.01); *G06Q 20/20* (2013.01); *G06Q 20/208* (2013.01); *G07G 1/0009* (2013.01); *G07G 1/0054* (2013.01); *G07G 1/12* (2013.01)

(58) Field of Classification Search
None
See application file for complete search history.

(56) References Cited

U.S. PATENT DOCUMENTS

| | | | |
|---|---|---|---|
| 3,878,365 A | 4/1975 | Schwartz | 235/61.7 R |
| 5,083,638 A | 1/1992 | Schneider | 186/61 |
| 6,047,262 A * | 4/2000 | Lutz | A47F 9/047 705/16 |
| 6,080,938 A | 6/2000 | Lutz | 177/25.15 |
| 7,044,370 B2 | 5/2006 | Bellis, Jr. et al. | 235/383 |
| 7,114,656 B1 | 10/2006 | Garver | 235/462.46 |
| 7,337,960 B2 | 3/2008 | Ostrowski et al. | 235/383 |
| 7,387,241 B2 | 6/2008 | Hassenbuerger | 235/383 |
| 7,416,117 B1 | 8/2008 | Morrison | 235/383 |
| 7,543,327 B1 * | 6/2009 | Kaplinsky | G08B 13/19656 348/143 |
| 7,648,064 B2 | 1/2010 | Lamparello et al. | 235/382 |
| 7,673,796 B2 | 3/2010 | Kobres et al. | 235/383 |
| 7,909,248 B1 | 3/2011 | Goncaves | 235/383 |
| 8,556,181 B2 | 10/2013 | Twiste | 235/470 |
| 2003/0018897 A1 | 1/2003 | Bellis, Jr. et al. | 713/182 |
| 2006/0080177 A1 | 4/2006 | Walter et al. | 705/23 |
| 2008/0061139 A1 | 3/2008 | Roquemore | 235/383 |
| 2008/0278321 A1 * | 11/2008 | McQueen | G08B 13/19619 340/568.1 |
| 2009/0039164 A1 | 2/2009 | Herwig et al. | 235/462.41 |

(Continued)

*Primary Examiner* — Paul Danneman
(74) *Attorney, Agent, or Firm* — MacCord Mason PLLC

(57) ABSTRACT

An improved self-checkout apparatus includes a self-checkout unit, a detection module configured to detect a product input and a fault during a transaction progression and a customer override that may be selected by a customer without attendant intervention to complete a transaction. The apparatus may also be considered a self-checkout kiosk including a security component associated with the consumer override. Systems and methods for a self-checkout kiosk including a point-of-sale system, a customer default override and a security component are also disclosed.

24 Claims, 5 Drawing Sheets

(56) References Cited

U.S. PATENT DOCUMENTS

| | | | |
|---|---|---|---|
| 2009/0134221 A1 | 5/2009 | Zhu et al. | 235/383 |
| 2009/0188975 A1 | 7/2009 | Fergen et al. | 235/385 |
| 2012/0187194 A1 | 7/2012 | Svetal et al. | 235/470 |
| 2012/0205448 A1 | 8/2012 | Hoskinson et al. | 235/440 |
| 2012/0241518 A1* | 9/2012 | Daily | A47F 9/047 235/383 |
| 2013/0020392 A1 | 1/2013 | Olmstead et al. | 235/440 |
| 2013/0085878 A1* | 4/2013 | Edwards | G07G 1/0054 705/23 |
| 2014/0129362 A1* | 5/2014 | Marquis | G07G 1/0036 705/23 |

* cited by examiner

SYSTEMS AND METHODS FOR AN IMPROVED SELF-CHECKOUT WITH LOSS PREVENTION OPTIONS

FIELD OF TECHNOLOGY

The present invention relates generally to systems and methods for self-checkouts, and more particularly to unattended self-checkout systems and methods including loss prevention options.

BACKGROUND

In a retail type environment, the efficiency with which consumers are able to process, pay for and purchase their desired items factors into the expenses for a retail type establishment. The labor hours attributable to manning checkout counters contributes greatly to this expense. In a typical retail operation, a shopper gathers the items desired for purchase and presents them at a checkout counter, a clerk then scans or enters the items' barcodes and the point-of-sale (POS) system totals the shopper's bill. The clerk may apply any promotional discounts to the bill, the shopper tenders payment, and the items may be bagged for the customer. A number of self-service automated checkout terminal concepts have been developed in an attempt to reduce the need for a check-out clerk, thus reducing associated labor costs.

Toward reducing operating expenses, some businesses have implemented self-checkout counters that substitute for individual clerks and baggers at each checkout terminal. Self-checkout terminals (also known as kiosks) are systems which are operated mainly by a customer without the direct aid of a dedicated checkout clerk. In such a system, the customer scans, selects or enters individual items for purchase, for example, across a scanner or screen and then places the selected items into a grocery type bag, if desired. The customer then pays for his or her purchase either at the self-service checkout terminal or at a central payment area. Thus, a self-service checkout terminal permits a customer to select, itemize and even pay for his or her purchases without the direct assistance of the retailer's personnel at each individual checkout terminal.

Self-checkout systems are also useful in other types of unattended environments, such as, employee break rooms, hotel vending areas, business lobby settings or hospitals. One of the many benefits of self-checkout systems is that they allow quick consumer-operated transactions, resulting in high throughput. This high throughput is typically a balanced transaction that allows new self-checkout users to feel in control of and comfortable with the transaction. Some self-checkout users quickly adapt and become comfortable with a self-checkout transaction and prefer to move as quickly as possible through the transaction, while others, such as new users, may prefer guidance through the transaction.

Typically, self-checkout systems fall into two main categories: attended and unattended. Attended self-checkout refers to the conventional model used in popular grocery chains whereby an attendant actively monitors multiple self-checkout stations and constantly assists consumers with their transactions for such things as weight faults, unscannable items, and the like. Unattended self-checkout refers to a variety of kiosk types, such as, vending kiosks in employee break rooms.

Unattended self-checkout systems usually do not require the physical presence of a dedicated attendant because unlike attended systems they, for example, use only a limited subset of transaction options, such as, limited tenders and they may have no weight security. As such, merchants may be comfortable using standard video surveillance systems as the primary loss prevention technology. Merchants who operate unattended vending kiosks also may rely on the tendency of employees to keep watch on each other as a theft deterrent.

Applicant, however, has discovered that the conventional attended and unattended scenarios often do not meet the needs of today's merchants and consumers. Consumers, for example, may have a preference for, or an avoidance of, the traditional attended or unattended scenario as they are usually presented, therefore, causing them to hesitate to complete a purchase using one or the other. Also, as merchants change their stores and checkout processes, the traditional checkout scenarios and loss prevention efforts may not adequately accommodate their changing needs, especially when self-checkouts are being implemented to speed throughput and lower attendant costs, but in actuality, the self-checkouts either offer limited services or stall when an exception occurs. Applicant recognizes the need for unattended self-checkout systems and methods having a loss prevention component without the drawbacks presented by traditional systems and methods.

SUMMARY

In accordance with the present disclosure, a new form of self-checkout is provided that is neither actively attended nor completely unattended. This new faun of self-checkout is a hybrid of the first two types of self-checkouts, and can be described as a "passively attended" self-checkout. This disclosure provides improved unattended and/or passive attendance systems and methods that are convenient, safe and efficient at providing a self-checkout transaction that is somewhere between a conventional self-checkout lane and a vending kiosk type scenario. Such systems are useful to merchants as the merchant's attempt to put improved systems in place in key locations within their retail space so that consumers with small numbers of items can check themselves out quickly and easily. However, merchants may consider certain aspects of both attended and unattended vending systems to be inappropriate for their needs, and the needs of their consumers.

For example, because only a single kiosk is often needed, rather than a conventional type multi-lane self-checkout, a full-time active attendant is considered to be inefficient and wasteful, both operationally and from a budget perspective. Likewise, many merchants also consider a conventional always-on DVR system to be excessive, and may not want to send the message of distrust to consumers implied by such system. Additionally, the footprint of conventional attended self-checkout systems may frequently be too large to fit in the small spaces within stores where merchants want to place kiosks, however, they do not want to resort to a completely unattended scenario.

The hybrid self-checkout functionality with user friendly options that merchants seek in changing and technologically advancing times is functionally not available. For example, because a hybrid self-checkout system may not have a dedicated attendant, more self-checkout security may be desirable. Such a hybrid self-checkout system may, for example, include weight security. Weight security is often included on attended self-checkouts and provides item identification via weight, whereby the system "learns" the acceptable weight ranges of items over time and deters theft by preventing consumers from putting items in a bag that have not been entered into the transaction or that weigh outside of expected ranges for a particular item. However, weight security is not an exact science, and thus has not developed for an unattended self-checkout scenario because a weight mismatch will usually cause an exception to occur that registers within the point-of-sale system as a fault. The fault must be cleared to complete the transaction and/or an attendant must override the fault for the transaction to proceed and the transaction stall to be removed. Many weight faults are in error, for example, changes in product packaging, using a consumers' own bags, children touching the bagging scale, partially consumed products (e.g. consumer takes a few sips of a bottled water, so the system doesn't recognize the product's weight), varying moisture content due to humidity, and other environmental variables may trigger the weight security and lock-up the system, even though the correct item has been scanned.

In an unattended self-checkout, merchants often desire such systems to have a higher level of loss prevention built-in because there is no longer an active attendant who is constantly monitoring activity. Therefore, one obstacle to the successful implementation of passively attended self-checkout environments is reducing loss via theft to a minimum, even without an active attendant. Using a bagging scale to achieve this typically includes an unacceptable number of weight faults (as caused by the variables described above) triggering the security and locking the system and does not feasibly lend itself to passive attendance because of the lack of dedicated attendants and due to the interruptions it would cause in the primary work roles of any non-dedicated attendant(s).

One aspect of the present disclosure is to provide a checkout apparatus including a self-checkout unit having a product identification device, a payment identification device, a microprocessor and memory operatively associated with one another to identify products being purchased, payments tendered therefor and to store transaction information locally or remotely. There may be a detection module in communication with the microprocessor and configured to detect a product input and direct a fault during transaction progression. The microprocessor includes programming configured to allow a user to enter an item in the product identification device, and to enter a default override and thereby complete the transaction without requiring attendant intervention.

In one example, the checkout apparatus may include a security component. The security component may include a bagging scale. The bagging scale may generally be used in conjunction with an integrated video camera. The integrated camera is mounted in or on the housing and, as a digital camera, supplies digital image data to electronics in the system. The security component may generate video snapshot coverage. The video snapshot coverage may be adapted to document the consumer transaction or portions thereof. The security component may include an integrated consumer-facing second camera, which may be positioned on the kiosk. The integrated consumer-facing second camera may be adapted to view items placed in a bagging area. The system with an integrated consumer-facing second camera may be adapted to instruct a consumer that a video security is activated.

The system may also include a display recording on a consumer interface. The integrated transaction-facing first camera and/or the consumer-facing second camera may be adapted to archive images. The system may include a user prompt to allow touch-screen interaction with the self-checkout to indicate that the user wants to checkout and pay for a purchase, to provide guidance to the user to scan an item in the product identification scanner, and allow the user to touch an input device of the checkout apparatus to accept the default override for an item scanned in the product identification scanner and to scan a payment token in the payment identification scanner and/or to scan a customer identification token.

Another aspect is to provide a self-checkout kiosk having a self-checkout station, a point-of-sale system and a security component. The self-checkout station may have a housing and a customer interface. A point-of-sale system may have a microprocessor and memory operatively associated with one another to identify products being purchased, payments tendered therefor and to store transaction information locally at the checkout station or remotely from the checkout station. The point-of-sale system includes programming configured to allow completion of a customer transaction. A customer default override option may be able to be selected by a customer without attendant intervention. The security component may be activated by a customer selection of a customer default override.

In some examples, the point-of-sale system includes a standard touch-screen customer display as a part of the customer interface. The customer interface may include a product identification device. The product identification device may be a scanner. The system may include a payment identification device. The payment identification device may be a scanner. The point-of-sale system may be configured so that customer activation of a peripheral device triggers the system to enter a security mode.

The self-checkout station may include a detection module for detecting a customer's actions. The transaction may be responsive and guided by the customer's actions throughout a transaction. In particular examples, the transaction security may be based upon consumer input, for example, selection of a customer override option. In some examples the customer's actions include scanning a customer loyalty card.

These and other aspects of the disclosure will become apparent to those skilled in the art after a reading of the following description of the examples when considered with the drawings. It will be apparent, however, that the description of embodiments is not intended to limit the present inventions, the scope of which should be properly determined by the appended claims

BRIEF DESCRIPTION OF THE FIGURES

Embodiments of the disclosure will be better understood by a reading of the Description of the Preferred Embodiments along with a review of the drawings, in which.

DESCRIPTION OF THE PREFERRED EMBODIMENTS

Figure 1:
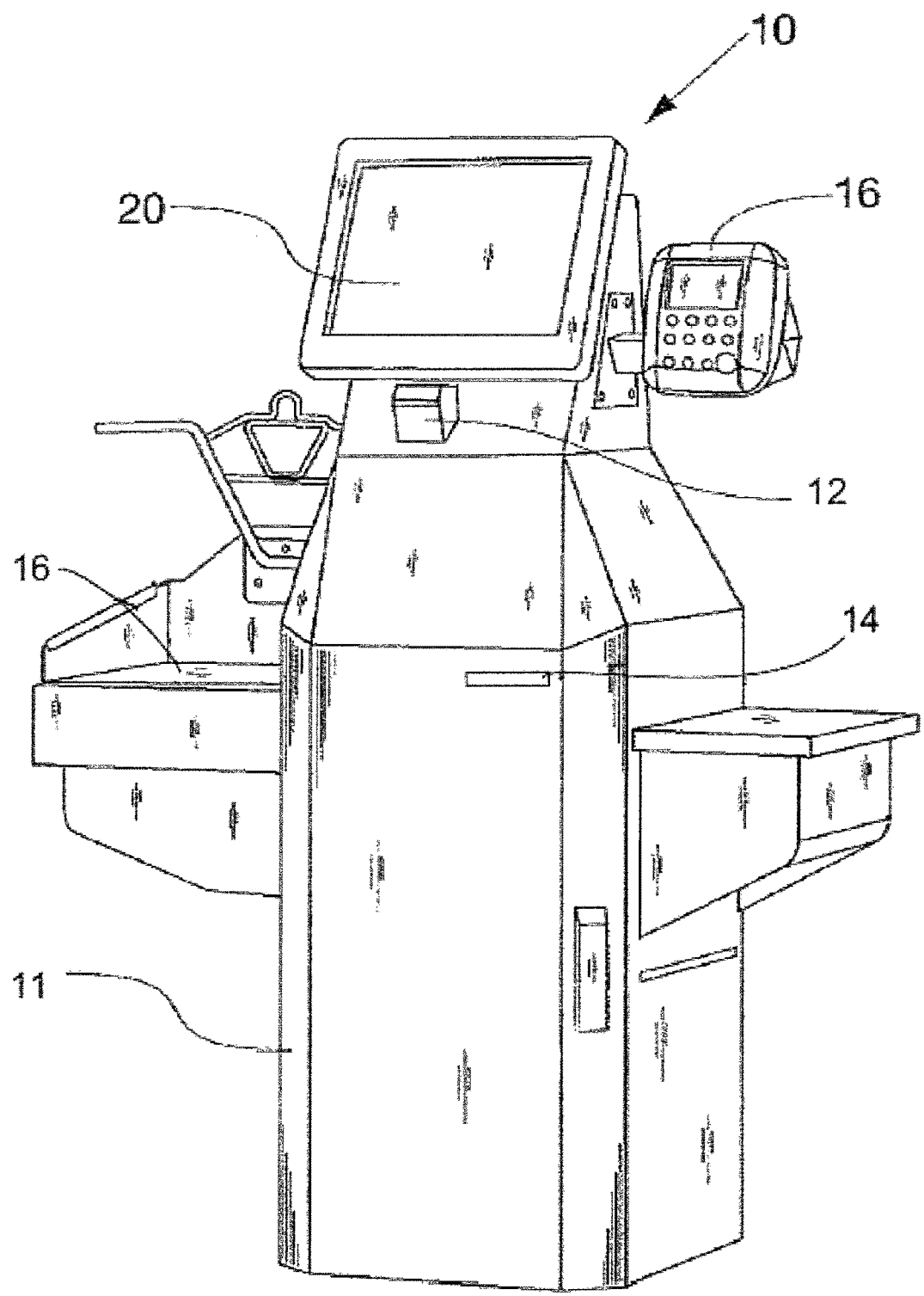
FIG. 1 is a front perspective view of one example of an improved self-checkout system according to the present disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 2:
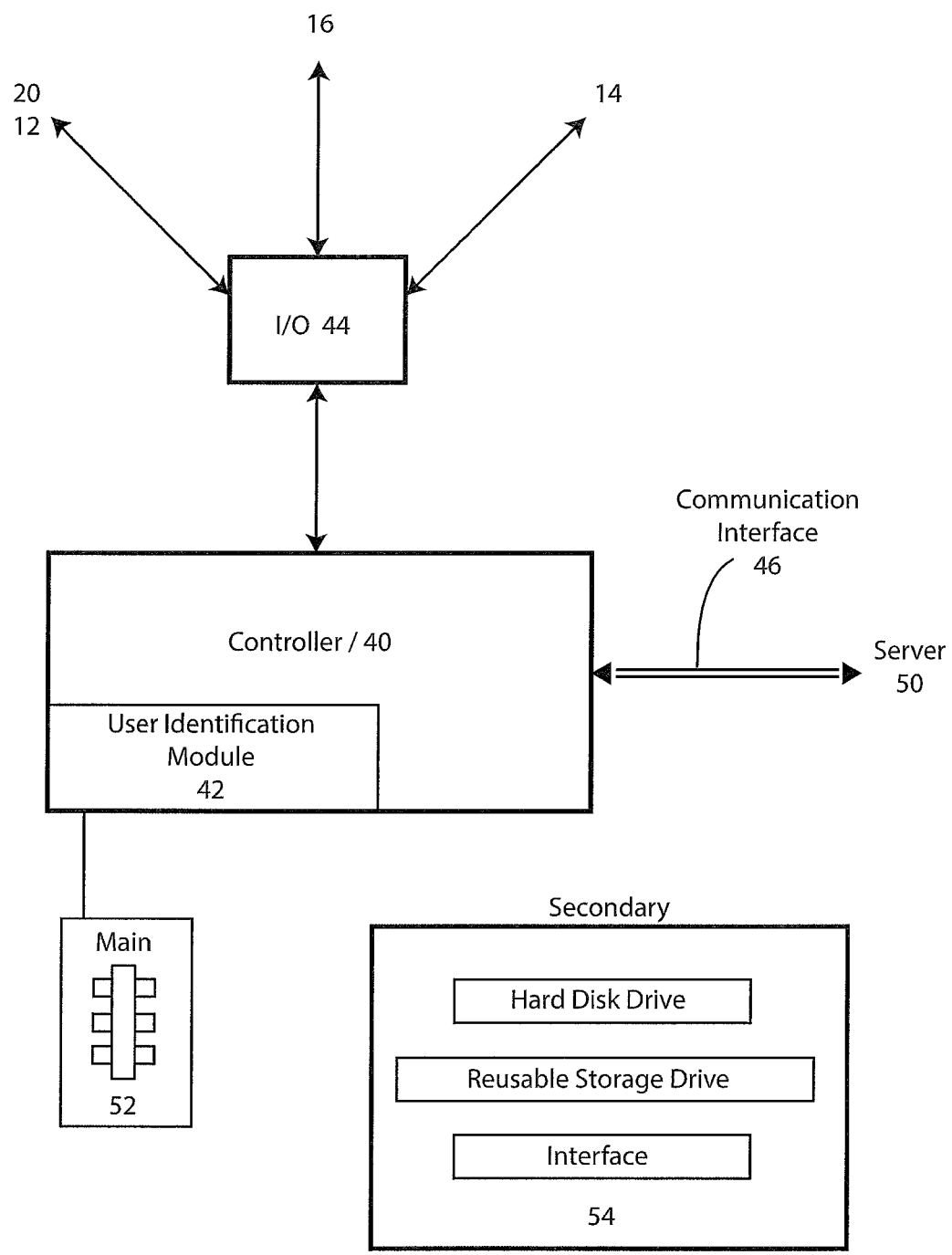
FIG. 2 is a diagram illustrating one example of electronic hardware in one of various self-checkout modules according to the present disclosure.

It will be understood that the illustrations are for the purpose of describing an exemplary embodiment of the invention and are not intended to limit the invention thereto. As shown in FIGS. 1 and 2, one example of an automated self-checkout system, generally designated 10, is shown. Typically, self-checkout systems include at least one kiosk. The kiosk usually includes a housing 11, typically of compact design, which accommodates or houses other aspects of any of the self-checkout systems shown and described herein. The housing 11 may be a pre-existing structure at the installation site of the self-checkout system, may resemble the housing as shown in FIG. 1, or may take on other shapes able to accommodate the other aspects of the invention. Those of ordinary skill in the art having the advantage of this disclosure will recognize that a variety of self-checkout elements may be included in any of the systems and methods shown herein. For example, such elements and systems shown and described in U.S. application Ser. No. 13/869,727 (Systems And Methods For An Improved Self-Checkout With Speed Tender Transaction Options); and U.S. application Ser. No. 13/758,320 (Improved Self-Checkout Systems And Methods), are incorporated herein by reference in their entireties in this disclosure but this disclosure is not necessarily limited thereto.

The kiosk may include input modules 12, output modules 14 and transaction modules 16. The input module 12, as seen in FIG. 1 may be, for example, a coupon-in center, credit/debit card reader, or a payment center. The input module 12 may typically be supported on, integral to, or attached to the housing 11. Input module 12 is arranged to accept input about or for the transaction, for example, from items being purchased by recognizing the item, such as through selection on the display 20 by the customer or by recognition of an identification or code. A bar code scanner would be another example of an input module 12 suitably found in the kiosk. Other examples, inter alia, may include one or more keypads to key in information, RFID reader, a microphone potentially with voice recognition software, a touch screen keypad, a video camera, tablet computer, wireless communication receiver, a credit card reader, a debit card reader, a smart card reader, a cash receiver a wireless transmission, a mobile phone, and/or any of these in combination.

Output module 14, may include a coin-out center, a cash-out center and/or a receipt center. Output module 14 is arranged to provide and receive information during a transaction. Output module 14 may provide instructions to the purchaser or provide feedback from input received through input module 12. For example, the identification and recorded price of scanned items may be displayed to the customer on display 20. In the case of a touch screen display, purchasers may also input information there, making the display 20 serve as both a part of the input module 12 and output module 14. A speaker (not shown) may also serve to provide information to consumers. Other examples of output module 14 may include a private printing page, a link transmitting to a handheld device such as a mobile phone or tablet computer or the like.

Transaction module 16 may include centers accommodated by housing 11 where parts of the transaction occur, such as the bagger 16 and potentially an auxiliary bagger. Transaction module 16 may also include, by way of example, weigh centers, bumper guards or transaction shelving centers.

The kiosk may further include, a controller 40 (see FIG. 2), operatively connected to the input module 12 and output module 14. The controller has programming arranged to process information from the input module 12, such as the items being purchased in the transaction, and to provide information through output module 14 to the customer to allow completion of a customer transaction through system 10.

A controller, such as a microprocessor, may be in the kiosk or store database computer, and usually includes an associated memory. The controller may have a clock component so that elapsed time between events can be determined. Other configurations of times can be used.

The computer system may include a main memory or a secondary memory, or both, that may communicate with the controller. The main memory is generally a random access memory (RAM) that may include an item buffer for temporarily holding identification information corresponding to scanned items before the items are verified by the kiosk. On the other hand, the secondary memory with standard input/output ports may include any storage medium such as but not limited to a hard disk drive, a SCSI drive, a removable storage drive or removable storage units and interface. Alternatively, the secondary memory may include handheld computing devices, as well as, one or more databases such as a look-up database that includes SKU number, price, item codes, tolerance range for the item or for a class of items, and corresponding weight, height, length, or width for each item in the store. This database may reside on one or more of different or additional computers such as at a central store server or a remote server outside of the location.

Additionally, it is contemplated that the kiosk may not include a main memory. In this situation, the controller may communicate with the secondary memory which may be a remote server, for example, accessed via local area network or global networking such as the Internet or Intranet, and refresh a display screen with information and software stored in the remote server.

Currently, unattended self-checkout systems are designed for a user, by way of example, to step consumers through a sequence of actions that are required to complete a transaction successfully. These steps, by way of example, may include, but are not limited to, invoking an initial transaction state, scanning items, invoking a checkout state, choosing a form of tender, and scanning a prepaid card or swiping a credit card.

Unattended vending self-checkout systems may reside in employee break rooms where staggered lunch shifts and work breaks cause several massive influxes of consumers at specific times throughout each work day. These influxes cause lines to form at the kiosks. It is not unusual for many of the consumers to have prepaid cards with stored value that is decremented with each purchase, and which the consumer may increment at their choosing using cash or credit at the kiosk. Typically, unattended self-checkout systems include some of the options found on an attended self-checkout, and as described above, but may have a smaller footprint and include fewer options, such as, for example, more limited payment options or cash back options. Additionally, modifications to certain peripheral devices, such as the bar code scanner and the magnetic credit card swipe, may allow progression of an expedited, often smaller, transaction. Security is usually important at unattended self-checkout, but, takes on different forms than found at attended self-checkouts, for example, as described above.

In one example, an unattended self-checkout may be used or may make up a self-checkout in a hybrid self-checkout system. In one embodiment, Applicant has discovered advantages of incorporating a security component, such as item security and/or weight fault security, into the unattended self-checkout system. For instance, the hybrid self-checkout may be programmed to allow consumers to override weight faults. Other examples may alternatively be adapted to call a passive attendant, if necessary or desired while maintaining a security module that will not lock the self-checkout system and cause unacceptable delays and checkout downtime.

In one example, the system may include a bagging scale in conjunction with an integrated video camera, consumer-facing and/or transaction item-facing, and consumer-facing questions and/or instructions that allow the consumer to override weight faults. The passively attended self-checkout provides the ability for more employees to focus on other primary job duties while occasionally sharing the task of intervening to assist a consumer with their transaction at the kiosk. This provides the merchant more flexibility with employee labor on an as-needed, passive basis, rather than on a constantly active basis wherein a large majority of labor time is spent waiting and watching and/or unlocking self-checkout systems. Also, the customer trust-factor and/or transaction satisfaction factor may be elevated between merchant and consumer by giving the consumer the choice to handle weight-based exceptions on their own, or with the assistance of an employee.

In another example, the safety component may include a video snapshot coverage. For instance, any of the unattended and/or passively attended self-checkout environments shown and described herein may include, for example, video surveillance and/or photos, snapshots, and/or displays to document the consumer transaction. In one example, the safety component includes video coverage when the consumer chooses to override an occurring weight fault and/or a questionable transaction. In yet another example, the safety component may include an integrated consumer-facing second camera. The consumer-facing second camera may be integrated to archive video images of which items were placed in the bags and/or to show the consumer that the system is recording video, video clips, and or pictures to document and verify whether or not the items placed on the bagging platform match the items in the transaction.

In one particular example, the integrated consumer-facing camera may be positioned on the kiosk, including on the top of either the kiosk and/or the touch screen or integrated into the kiosk and/or display. In some examples the camera may include a sleep function for energy/cost savings and an activation function for video recording. For instance, rather than being always on, the camera may only activate during any of the portion of a transaction where the consumer is allowed to handle weight faults themselves, as shown and described herein. When activated, the camera may display, for example, a thumbnail size live video image, clip and/or picture of the consumer on the screen to indicate that the consumer's actions and choices are being documented for auditing and or security purposes. Therefore, video footage and/or identifying information may only collect and/or be displayed when the consumer is given an override option, such as, the opportunity to handle a weight fault.

In these scenarios, by way of example, the system may give the consumer two choices for paths of action: 1) Handle/override the weight fault themselves or 2) Call the passive attendant. When the system is in this type of state and is waiting for input from the consumer, it may display the identifying information, such as, the live video thumbnail image of the consumer, alongside the current message text. If the consumer chooses to handle the weight fault themselves, the system may archive a still image from the video footage of the consumer and store it in the database alongside the transaction data for auditing purposes. By only displaying the live video image of the consumer during weight fault scenarios, this embodiment may avoid the negative message of consumer distrust associated with always-on video during the entire or a large portion of the transaction.

Furthermore, by only showing the video during consumer override scenarios, such as, weight fault scenarios, it explicitly communicates to the consumer that they have the potential to incriminate themselves by handling the weight fault in a dishonest manner. In addition to archiving the snapshot (i.e. still photo) of the consumer alongside the transaction data when they override a weight fault, there may also be a secondary integrated camera oriented down the bagging area that also archives identifying information, such as photos and or video, of the physical items being bagged alongside the transaction data for an additional layer of security auditing. This may also eliminate the need for the merchant to review hours upon hours of archived footage from an always-on surveillance system, and then to try and compare that to the archived transaction data.

In use, for example, the consumer may place empty bags on a passively attended bagging platform when the lane is idle and not being used. The system may provide audio and/or text prompts during the transaction, such as, "Did you bring your own bags" either proactively and/or when a fault is determined by a weight fault module. The system may provide, for example, a live video image of consumer on the screen when the consumer selects "yes." The system may be programmed to archive a still frame of the consumer from the video and to archive it alongside the transaction data when the consumer selects the "yes" option. Alternatively, a mismatch may be determined by the system between a bagged item and a scanned item, for example, a weight fault and/or a mismatch in the items dimensions or specifications.

When a consumer places an item on the scale that has not been scanned, the system may detect the un-scanned item placed on the bagging platform. The system may prompt (text and/or audio) "Please remove the last item placed on bagging platform." The consumer may be provided the option to select "Continue." Then, the system for example, may record a consumer's verification, transaction number, time, and date and/or an image and customer association number if applicable. As a result, the transaction is not locked, as usually occurs with faults such as weight faults, however, security remains in place for the unattended self-checkout and the transaction proceeds.

In another embodiment, if the consumer does not remove an item when the system requests and does not select to override a fault, for example a weight fault or mis-scanned item, for a pre-selected period of time, for example, for more than 20 seconds, the system may be triggered to record security information and/or a consumer's verification, transaction number, time, and date, image and customer association number if applicable, and may also earmark the transaction. The system may also prompt a message, such as, "Please wait. Help is on the way." In addition, lane lights and/or bumper LED lights may be programmed to flash or light (for a period of time or and/or indefinitely until an attendant arrives) an attendant may be notified by the system that a transaction has been earmarked. If the consumer chooses to alert an attendant for help, the attendant may attend to the situation to meet the consumer's needs. If the system alerted an attendant of an earmarked transaction, an attendant may respond to the self-checkout to supervise and/or survey the transaction.

In one embodiment, the passive self-checkout may work with prepaid cards and credit cards. However, the invention encompasses embodiments that are effective with all other forms of tendering and/or the devices and technologies used to enable those tenders. One example might include, but should not be limited to, biometric authentication for prepaid accounts, charge accounts, credit/debit payments, and EBT/WIC. Near-field communication technology could also be used and is to be considered within the scope of this invention.

Figure 3:
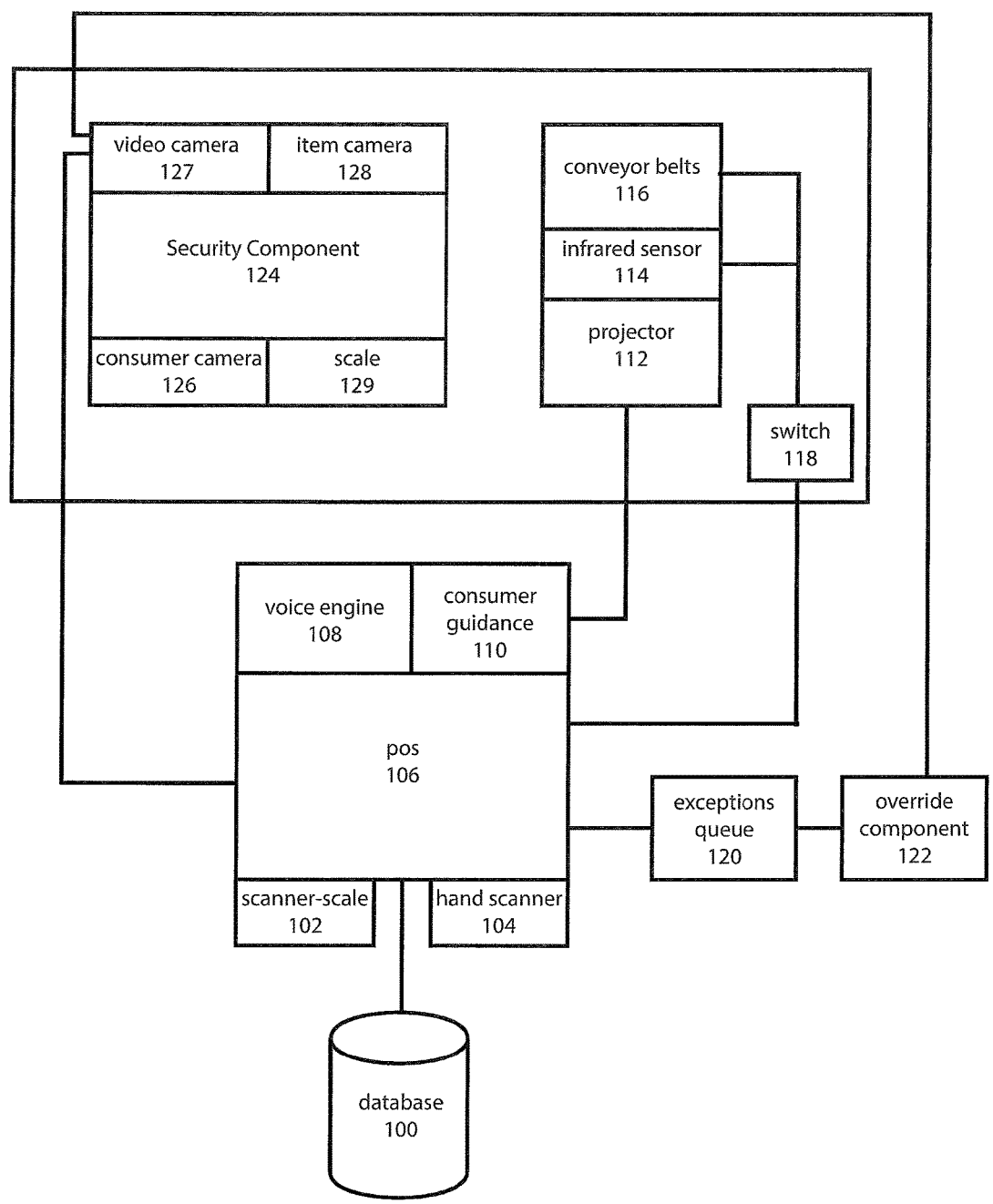
FIG. 3 is a diagram illustrating another example of self-checkout modules and components of the disclosure.

In another embodiment, as shown in FIG. 3, a self-checkout kiosk includes a self-checkout station having a housing and a customer interface. The customer interface may include a product identification device. The kiosk incudes a point-of-sale system 106 having a microprocessor and memory operatively associated with one another to identify products being purchased, payments tendered therefor and to store transaction information locally at the checkout station or remotely from the checkout station. The point-of-sale system 106 may include programming configured to allow a security component 124 to document the transaction when the system detects a consumer fault override through an override component 122. The point-of-sale system may be configured so that customer override of a fault/exception 120 triggers the system to enter a security transaction mode. The transaction may, by way of example be documented, by identifying the consumer and associating the transaction and or option selection and/or security information with the consumer and related information stored in the database 100. Security devices may include, by way of example, a scanner 102, a camera 126, a video camera 127, weight fault detectors 129, item dimension detectors and/or or other various fault detection devices as previously discussed.

Figure 4:
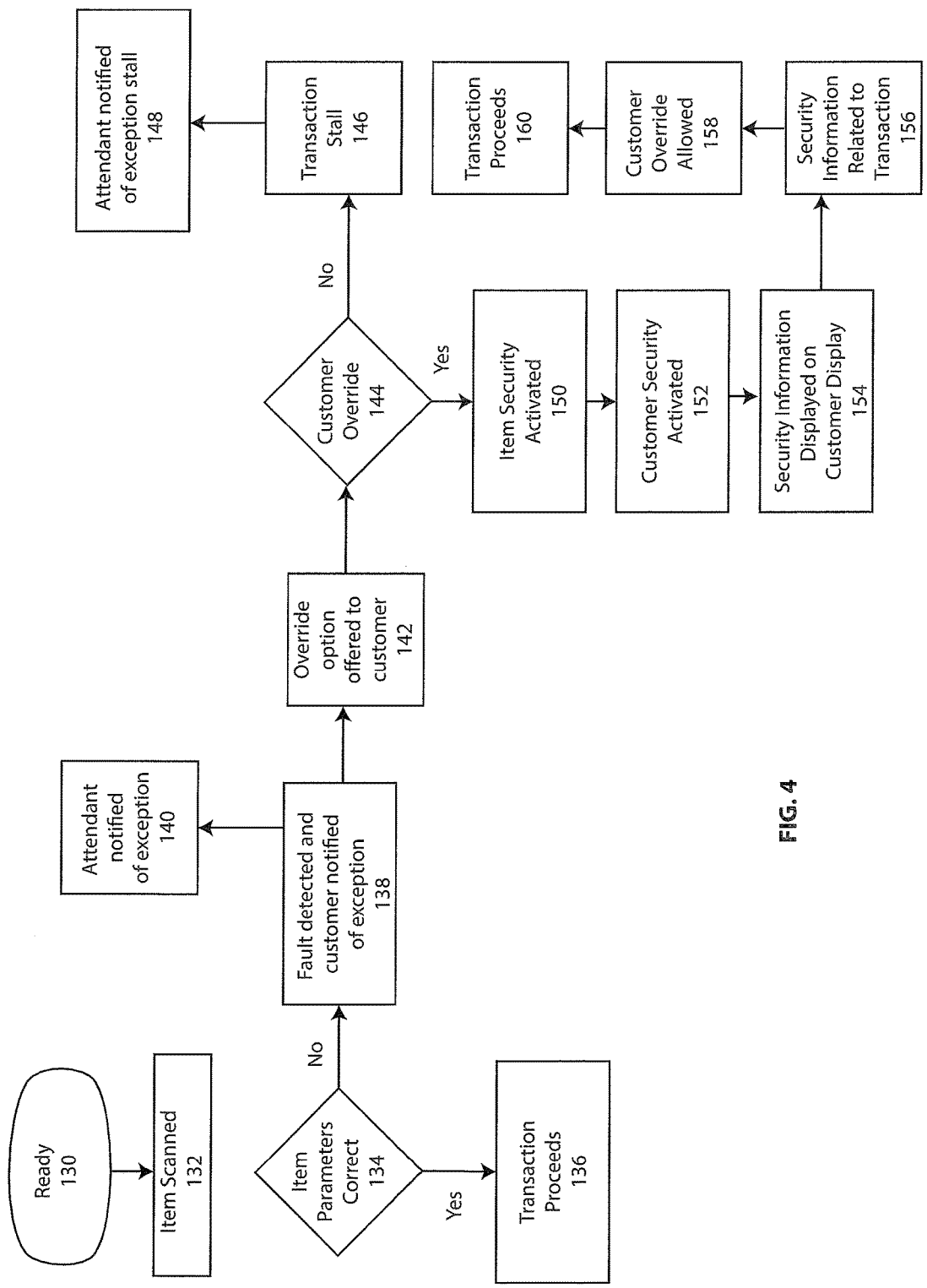
FIG. 4 is one example of a self-checkout transaction including a customer override.

The scope of the invention also includes systems and methods of overriding an exception at a self-checkout kiosk. As shown in FIG. 4, a customer may scan an item 132 at a ready kiosk 130. The system detects if the item parameters are correct 134. If all item parameters are acceptable, then the transaction proceeds for the next item to be scanned 136. If an item parameter triggers a fault, then an exception is logged and the customer is notified of the exception 138, which typically stalls the transaction. An attendant may be notified of the logged exception 140. In applicant's system, a customer override option is offered to the customer 142. If the customer decides not to override the exception 144 then the transaction stalls 146 and the attendant may be notified of a transaction stall 148. If the customer selects the customer override, a security component is activated. The component security may include a purchased item security, such as an item-facing camera 150. The component security may include customer security 152, such as a customer facing camera. The security images from one or more of the cameras or a portion thereof may be displayed on a customer display 154. The security information is related to the transaction and may include, by way of example, information about the exception such as weight mismatch, customer and item video and customer options/validations 156. The customer override is allowed 158 and the transaction proceeds 160.

Figure 5:
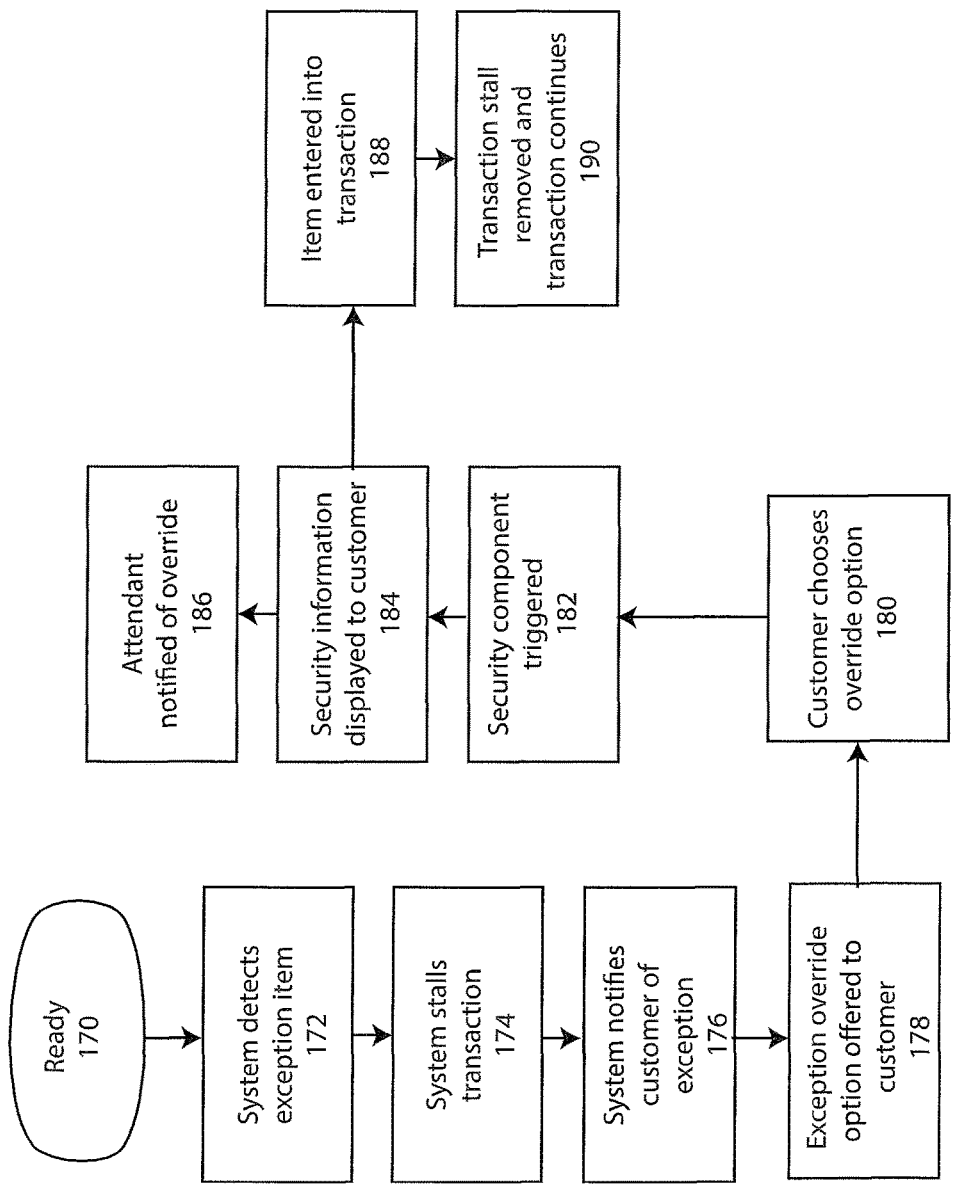
FIG. 5 is another example of a flow chart for a self-checkout transaction including a customer override.

In another example, as seen in FIG. 5, the system may detect exceptions unrelated to a scanned item 172, such as, for example, when incorrect customer identification information is detected or when customer bags are placed on a bagging scale. An attendant may be alerted at any point in a transaction 186, for example, as soon as a fault is detected or after a customer override is selected 180.

Certain modifications and improvements will occur to those skilled in the art upon a reading of the foregoing description. It should be understood that all such modifications and improvements have been deleted herein for the sake of conciseness and readability but are properly within the scope of the following claims.

We claim:
1. A self-checkout apparatus comprising:
an unattended self-checkout unit having a product identification device, a payment identification device, a microprocessor and memory operatively associated with one another to identify products being purchased, payments tendered therefor and to store transaction information locally or remotely,
a detection module in communication with the microprocessor and configured to detect a product input and direct a fault during transaction progression triggering that an exception has occurred where a mismatch between an expected input and an actual input is detected,
a self-checkout display in communication with the detection module and configured to offer on the display a customer self-override option configured to allow the customer to self-override the exception without an exception correction and proceed through the transaction with the actual input in the transaction,
wherein the microprocessor includes programming configured to allow a user to enter an item into a transaction with the product identification device, and to select an exception override that allows the transaction to proceed with an item entry flagged as an exception without requiring a correction of the exception and to complete the transaction without requiring removal of the actual input and without an attendant intervention, and
a security component that is activated when the user selects the exception override from the customer self-override option, the security component including a security information related to the transaction, the security information recording the mismatch and a customer validation of the exception override as the override is allowed and the transaction proceeds.

2. The self-checkout apparatus in claim 1, wherein the security component includes a bagging scale in conjunction with an integrated video camera.

3. The self-checkout apparatus in claim 2, wherein the security component generates video snapshot coverage.

4. The self-checkout apparatus in claim 3, wherein the video snapshot coverage is adapted to document the consumer transaction.

5. The self-checkout apparatus in claim 1, wherein the security component includes an integrated consumer-facing second camera.

6. The self-checkout apparatus in claim 5, wherein the integrated consumer-facing second camera is positioned on the self-checkout unit.

7. The self-checkout apparatus in claim 5, wherein the integrated consumer-facing second camera is adapted to view items placed in a bagging area.

8. The self-checkout apparatus in claim 5, wherein the integrated consumer-facing second camera is adapted to instruct a consumer that a video security is activated.

9. The self-checkout apparatus in claim 8, including a display recording on a consumer screen.

10. The self-checkout apparatus in claim 5, wherein the integrated consumer-facing second camera is adapted to archive images.

11. The self-checkout apparatus in claim 1, including a user prompt to allow touch-screen interaction with the self-checkout to indicate that the user wants to checkout and pay for a purchase, to provide guidance to the user to scan an item in the a product identification scanner, and allow the user to touch an input device of the checkout apparatus accept the default override for an item scanned with the product identification scanner and to scan a customer identification token.

12. The self-checkout apparatus in claim 11 wherein the customer identification token includes a form of payment that is accepted by the checkout apparatus as payment for the items scanned during the transaction.

13. A self-checkout kiosk comprising:
an unattended self-checkout station having a housing and a customer interface,
a point-of-sale system having a microprocessor and memory operatively associated with one another to identify products being purchased, payments tendered therefor and to store transaction information locally at the checkout station or remotely from the checkout station, wherein the point-of-sale system includes programming configured to allow completion of a customer transaction,
a customer default override option able to be selected by a customer without an attendant intervention, the customer default override configured to direct the entry of an item information into the transaction without correction and still with the item information that triggered the exception even though the item information triggered an exception originally, and
a security component activated by customer selection of the customer default override option, the security component recording a security information related to the exception override when the override is allowed and the transaction proceeds even with the mismatch of information when validated by the exception override.

14. The kiosk of claim 13, wherein the customer interface includes a customer display.

15. The kiosk of claim 14 wherein the customer interface includes a product identification device.

16. The kiosk of claim 15 wherein the product identification device is a scanner.

17. The kiosk of claim 13 including a payment identification device.

18. The kiosk of claim 17 wherein the payment identification device is a scanner.

19. The kiosk of claim 13 wherein the point-of-sale system is configured so that customer selection of the customer default override triggers a security information presentation to the customer.

20. The kiosk of claim 19 wherein the security information presentation is presented to the customer on the customer interface.

21. The kiosk of claim 20 further including a first customer-facing security device.

22. The kiosk of claim 21 including a second transaction-facing security device.

23. The kiosk of claim 22 wherein the security information presentation includes a customer information collected from the first customer-facing security device.

24. The kiosk of claim 23 wherein the security information presentation also includes a transaction information collected from the second transaction-facing security device.

* * * * *